(12) United States Patent
Hughes et al.

(10) Patent No.: US 10,178,000 B2
(45) Date of Patent: Jan. 8, 2019

(54) INTEGRATED STORAGE/SAN MONITORING AND CONTROL SYSTEM

(71) Applicant: Dell Products L.P., Round Rock, TX (US)

(72) Inventors: Kevin Allen Hughes, Cedar Park, TX (US); Sean Trevor McGinnis, Minneapolis, MN (US)

(73) Assignee: Dell Products L.P., Round Rock, TX (US)

( * ) Notice: Subject to any disclaimer, the term of this patent is extended or adjusted under 35 U.S.C. 154(b) by 172 days.

(21) Appl. No.: 15/216,460

(22) Filed: Jul. 21, 2016

(65) Prior Publication Data

US 2018/0026863 A1 Jan. 25, 2018

(51) Int. Cl.
*H04L 12/26* (2006.01)
*G06F 3/06* (2006.01)
*H04L 29/08* (2006.01)
*H04L 12/24* (2006.01)

(52) U.S. Cl.
CPC .......... *H04L 43/06* (2013.01); *G06F 3/0605* (2013.01); *G06F 3/067* (2013.01); *G06F 3/0653* (2013.01); *H04L 41/22* (2013.01); *H04L 67/1097* (2013.01)

(58) Field of Classification Search
CPC ..... H04L 43/06; H04L 41/22; H04L 67/1097; G06F 3/0605; G06F 3/067; G06F 3/0653
USPC ........................................................ 709/224
See application file for complete search history.

(56) References Cited

U.S. PATENT DOCUMENTS

| | | | |
|---|---|---|---|
| 6,839,746 B1 | 1/2005 | Muthiyan et al. | |
| 7,536,693 B1 * | 5/2009 | Manczak | G06F 3/061 709/226 |
| 8,019,849 B1 | 9/2011 | Lopilato et al. | |
| 2007/0038679 A1 | 2/2007 | Ramkumar et al. | |
| 2013/0263130 A1 * | 10/2013 | Sugihara | G06F 9/455 718/1 |

(Continued)

OTHER PUBLICATIONS

"Montior Storage Performance—Capacity Planning—Solarwinds, Storage Resource Monitor," 2003-2016, pp. 1-5, Solarwinds, http://www.solarwinds.com/storage-resource-monitor.

(Continued)

*Primary Examiner* — Tu T Nguyen
(74) *Attorney, Agent, or Firm* — Haynes and Boone, LLP

(57) ABSTRACT

An integrated storage/SAN monitoring and control system includes a storage device, a switch device associated with an API, and a management system. The switch device receives storage device information from the storage device via an API call using the API, and transmits the storage device information and switch device information to the management system via an API call using the API. The management system receives the storage device information and the switch device information from the switch device, determines storage device control instruction(s) and switch device control instruction(s) using the storage device information and the switch device information, and transmits the storage device control instruction(s) and switch device control instruction(s) to the switch device via an API call using the API. The switch device then executes the switch device instruction and transmits the storage device instruction to the storage device for execution via an API call using the API.

20 Claims, 11 Drawing Sheets

(56) References Cited

U.S. PATENT DOCUMENTS

2016/0344596 A1* 11/2016 Holden .............. H04L 67/1097

OTHER PUBLICATIONS

"ManageEngine OpStor Features, Multi-Vendor Storage Management, Heterogeneous Management Tool for Storage Area Networks," 2016, pp. 1-2, OpStor, Zoho Corp., https://www.manageengine.com/it/opstor/features.html.

* cited by examiner

FIG. 9

INTEGRATED STORAGE/SAN MONITORING AND CONTROL SYSTEM

BACKGROUND

The present disclosure relates generally to information handling systems, and more particularly to an integrated monitoring and control system for storage system and storage area network (SAN).

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One type of information handling system includes a storage area networks (SAN) that couples a computing device to a storage system. Users of such storage/SAN systems are conventionally required to configured and monitor each of the separate components (e.g., switch devices in the SAN, storage devices in the storage system, etc.) using multiple vendor tools and users interfaces. The need to configure and monitor storage/SAN systems in this manner raises a number of issues, as actions such as zoning, end-to-end performance monitoring and troubleshooting, and individual SAN device environment monitoring and recovery may be required based on other actions performed on other devices in the storage/SAN system. In a single monolithic chassis-based system that contains both modular switches and modular storage, information needed for such configuration and monitoring can be exchanged via a chassis management controller subsystem using internal communication mechanisms. However in more typical distributed storage and SAN systems where the components are physically located in different places, there is no equivalent to the chassis management controller subsystems and internal communication mechanisms of a single monolithic chassis-based system. Rather, the devices in such a system are connected via external communication mechanisms such as Ethernet or Fibre Channel, and are typically provided by different vendors, thus allowing only high level access to the internal performance and platform device environment state.

For example, the configuration of a Logical Unit Number (LUN) on a target storage array may require making an initiator (e.g., a storage adapter, a Host Bus Adapter (HBA), or a Converged Network Adapter (CNA)) aware of the LUN as well as adding related zoning information (e.g., World Wide Names (WWNs) in the common zone) to the switch device(s) in the SAN. In another example, when analyzing end-to-end performance of the storage/SAN system, the state of the link on each end may need to be known in order to determine information such as Buffer-to-Buffer (BB) credit starvation or slow drainer devices. Conventional systems such as SAN level monitoring tools may allow monitoring at the application level, but at storage level (e.g., the Redundant Array of Independent Disk (RAID) controller level) and high level SAN points, there is no ability to perform such end-to-end monitoring. In yet another example, when trying to determine the effect of an environmental change in various components in the storage/SAN system (e.g., temperature, optical cable status, noise, electric and magnetic field (EMF), etc.) on the end-to-end traffic behavior, correlating conditions and events in the end-to-end components to that traffic behavior is difficult, and detailed feedback and control for reacting to adverse conditions is not available.

Accordingly, it would be desirable to provide for improved storage/SAN system monitoring and control.

SUMMARY

According to one embodiment, an information handling system (IHS) includes a communication system; a processing system that is coupled to the communication system; and a memory system that is coupled to the processing system and that includes instructions that, when executed by the processing system, cause the processing system to provide a device information retrieval and reporting engine that is associated with an Application Programming Interface (API) and that is configured to: receive storage device information through the communication system from a storage device via an API call using the API; transmit the storage device information and switch device information through the communication system to a management system via an API call using the API; receive at least one storage device control instruction and at least one switch device control instruction through the communication system from the management system via an API call using the API; execute the at least one switch device instruction; and transmit the at least one storage device instruction through the communication system to the storage device for execution via an API call using the API.

BRIEF DESCRIPTION OF THE DRAWINGS

FIG. 9 is a screen shot view illustrating an embodiment of the management system of FIG. 4 displaying an integrated storage/SAN event log screen.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
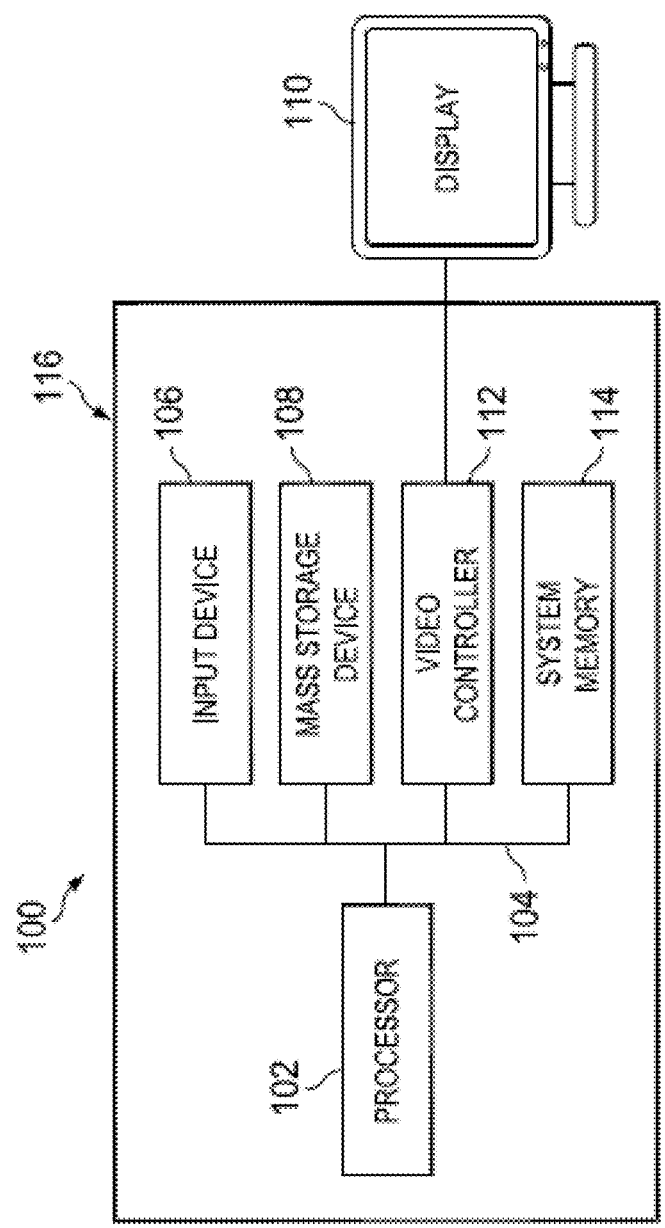
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
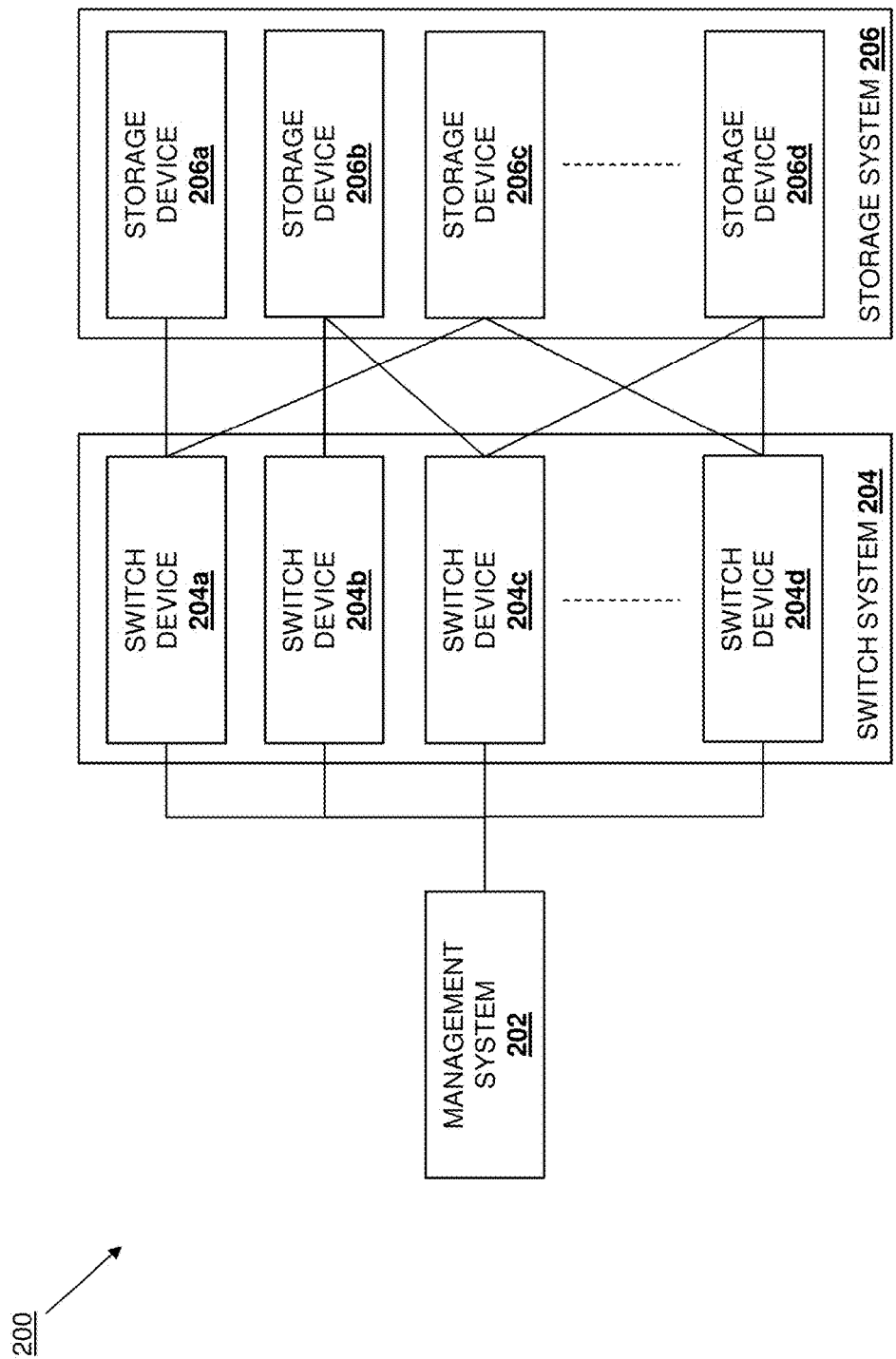
FIG. 2 is a schematic view illustrating an embodiment of an integrated storage/SAN monitoring and control system.

Referring now to FIG. 2, an embodiment of an integrated storage/storage area network (SAN) monitoring and control system 200 is illustrated that includes a management system 202. In an embodiment, the management system 202 may include one or more server devices and/or other computing devices (e.g., a desktop computing device, a laptop/notebook computing device, a tablet computing device, a mobile phone, etc.) known in the art. The management device 202 is coupled to a switch system 204 having a plurality of switch devices 204a, 204b, 204c, and up to 204d that provide a SAN. While the switch system 204 is illustrated as including four switch devices, one of skill in the art in possession of the present disclosure will recognize that more or fewer switch devices or other networking devices may be included in the switch system 204 to provide the SAN while remaining within the scope of the present disclosure. The switch system 204 is coupled to a storage system 206 having a plurality of storage devices 206a, 206b, 206c, and up to 206d. While the switch system 204 is illustrated as including four storage devices, one of skill in the art in possession of the present disclosure will recognize that more or fewer storage devices or other storage components may be included in the storage system 206 while remaining within the scope of the present disclosure.

Any or all of the switch devices 204a-d may be coupled to the storage devices 206a-d via one or more links. For example, any the switch device(s) 204a, 204b, 204c, and/or 204d may be coupled to any of the storage devices 206a, 204b, 204c, and/or 204d by an in-band link such as, for example, an in-band Fibre Channel (FC) link; by an in-band FC link and an out-of-band Ethernet link, and/or by other in-band and/or in-band/out-of-band link combinations. While the integrated storage/SAN monitoring and control system 200 is illustrated with a particular coupling of the switch system 204 to the storage system 206 (e.g., with the switch device 204a having one or more links to each of the storage devices 206a and 206c, the switch device 204b having one or more links to the storage device 206b, the switch device 204c having one or more links to each of the storage devices 206b and 206d, and the switch device 204d having one or more links to each of the storage devices 206c and 206d), one of skill in the art in possession of the present disclosure will recognize that any of the switch devices in the switch system 204 may be linked to any or all of the storage devices in the storage system 206 while remaining within the scope of the present disclosure. In a specific embodiment, the storage devices 206a-d in the storage system 206 may be provided by a Redundant Array of Independent Disks (RAID) system that includes RAID controllers, RAID devices, and/or other RAID subsystems known in the art. However, other storage systems utilizing other types of storage technology will benefit from the teachings of the present disclosure and thus are envisioned as falling within its scope.

Figure 3:
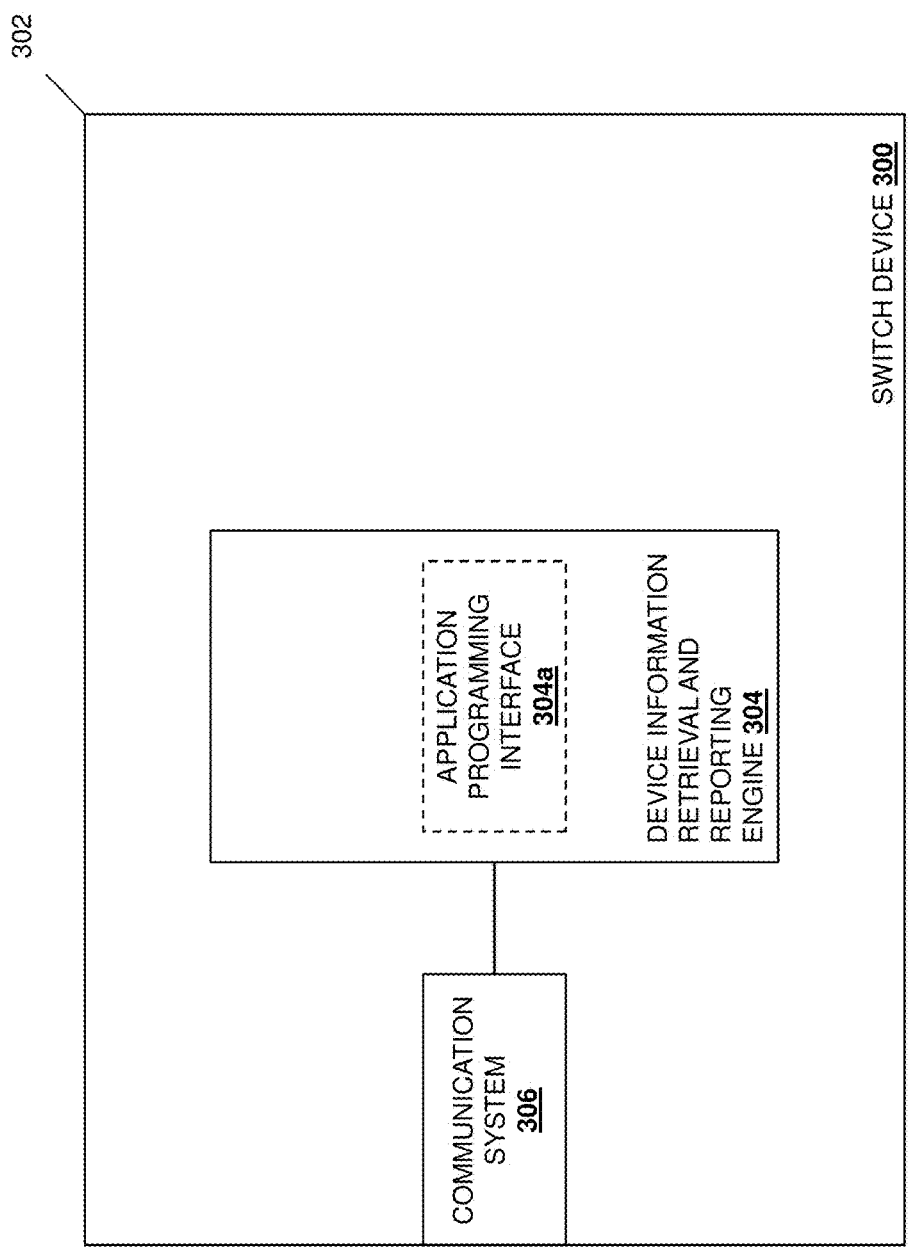
FIG. 3 is a schematic view illustrating an embodiment of a switch device used in the integrated storage/SAN monitoring and control system of FIG. 2.

Referring now to FIG. 3, an embodiment of a switch device 300, which may be any of the switch devices 204a-d in the switch system 200 of FIG. 2, is illustrated. In an embodiment, the switch device 300 may be provided by the IHS 100 discussed above with reference to FIG. 1, and/or may include some or all of the components of the IHS 100. In the illustrated embodiment, the switch device 300 includes a chassis 302 that houses the components of the switch device 300, only some of which are illustrated in FIG. 3. For example, the chassis 302 may house a processing system (not illustrated, but which may include the processor 102 discussed above with reference to FIG. 1) and a memory system (not illustrated, but which may include the memory system discussed above with reference to FIG. 1) that include instructions that, when executed by the processing system, cause the processing system to provide a device information retrieval and reporting engine 304 that is configured to perform the functions of the device information retrieval and reporting engines and switching devices discussed below. In a specific embodiment, the device information retrieval and reporting engine 304 may provide an agent on the switch device 300 that assists in the management and control of the switch device 300 and the storage devices 206a-d as described below. For example, an agent may be provided in the switch device 300 that is the same or similar to agents provided in the storage devices 206a-d in the storage system 206, which provides for a tight coupling of the information that is exchanged via the API as discussed below and allows the management system 202 to view the switch devices 204a-d and storage devices 206a-d as common components in the system.

In the illustrated embodiment, the device information retrieval and reporting engine 304 operates according to an application programming interface (API) 304a that is provided for the switch device 300 (indicated by the dashed line in FIG. 3 to illustrate the API/switch device association). In an embodiment, the API 304a provided for the switch device may be provided by a JavaScript Object Notation (JSON) based equipment-to-equipment management and control interface and governing control protocol, an example of which is included at the end of this description and referenced throughout the description to provide an example of an API that may be provided to realize the functionality described below. However, one of skill in the art in possession of the present disclosure will recognize that other APIs and/or interfaces/protocols may provide the functionality of the device information retrieval and reporting engine 304 and switch devices 300 discussed below while remaining within the scope of the present disclosure. The chassis 302 also houses a communication system 306 that is coupled to the device information retrieval and reporting engine 304 (e.g., via a coupling between the communication system 306 and the processing system), and that may include a network interface controller (NIC), a wireless communication subsystem, and/or other communication subsystems known in the art. While specific components of the switch device 300 have been illustrated and described, one of skill in the art in possession of the present disclosure will recognize that other components may be included in the chassis 302 and utilized to perform both the functionality described below as well as conventional switch device functionality while remaining within the scope of the present disclosure.

Figure 4:
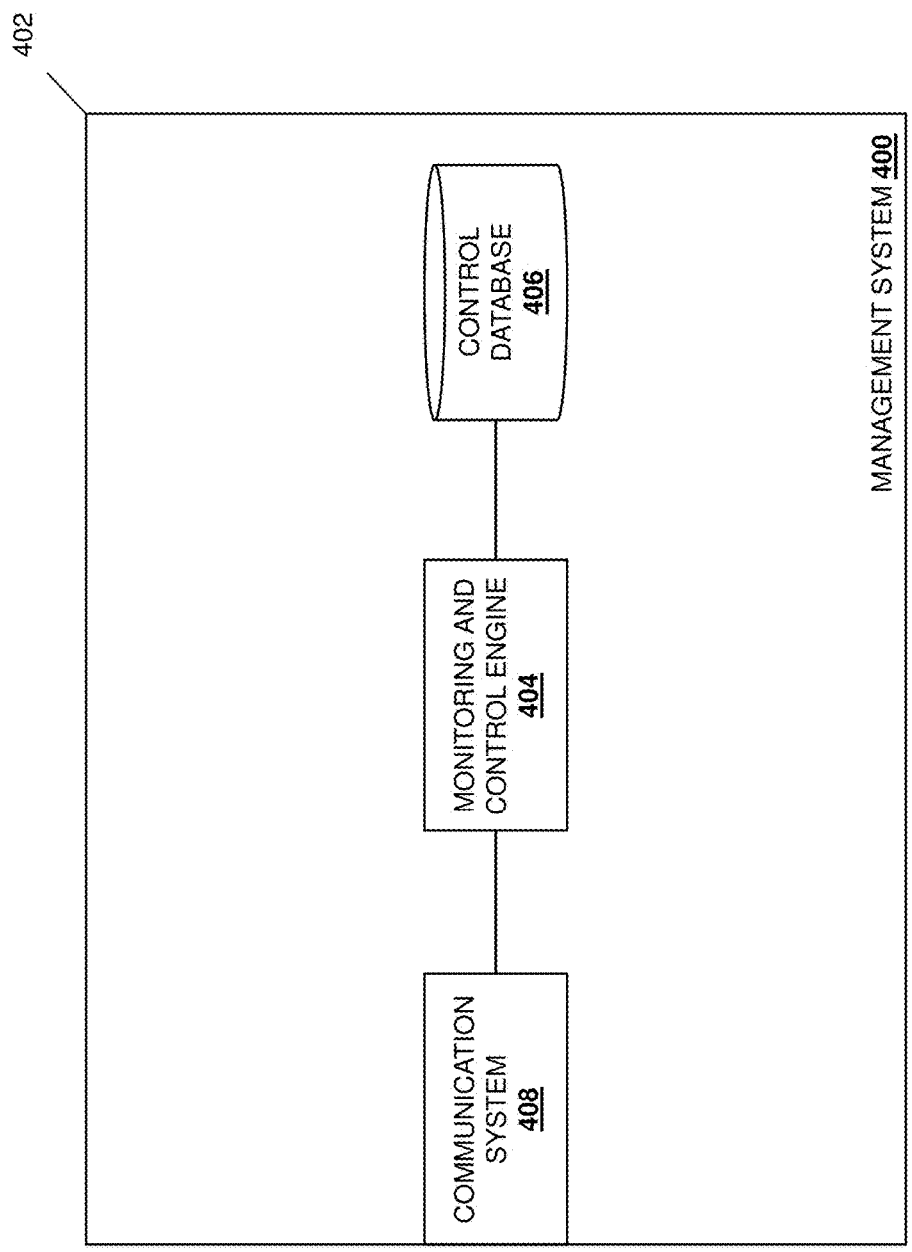
FIG. 4 is a schematic view illustrating an embodiment of a management system used in the integrated storage/SAN monitoring and control system of FIG. 2.

Referring now to FIG. 4, an embodiment of a management system 400, which may be management system 202 of FIG. 2, is illustrated. In an embodiment, the management system 400 may be provided by the IHS 100 discussed above with reference to FIG. 1, and/or may include some or all of the components of the IHS 100. As discussed above, the management system 400 may be provided by one or more server devices, desktop computing devices, laptop/notebook computing devices, tablet computing devices, mobile phones, and/or other computing devices known in the art. In the illustrated embodiment, the management system 400 includes a chassis 402 that houses the components of the management system 400, only some of which are illustrated in FIG. 4. For example, the chassis 402 may house a processing system (not illustrated, but which may include the processor 102 discussed above with reference to FIG. 1) and a memory system (not illustrated, but which may include the memory system discussed above with reference to FIG. 1) that include instructions that, when executed by the processing system, cause the processing system to provide a monitoring and control engine 404 that is configured to perform the functions of the monitoring and control engines and management systems discussed below.

The chassis 402 also houses a storage device (not illustrated, but which may be the storage device 108 discussed above with reference to FIG. 1) that is coupled to the monitoring and control engine 404 (e.g., via a coupling between the storage device and the processing system) and that includes a control database 406 that is configured to store the rules and/or other data utilized by the monitoring and control engine 404 to provide the functionality discussed below. The chassis 402 also houses a communication system 408 that is coupled to the monitoring and control engine 404 (e.g., via a coupling between the communication system 306 and the processing system), and that may include a network interface controller (NIC), a wireless communication subsystem, and/or other communication subsystems known in the art. While specific components of the management system 400 have been illustrated and described, one of skill in the art in possession of the present disclosure will recognize that other components may be included in the chassis 402 and utilized to perform both the functionality described below as well as conventional management system functionality while remaining within the scope of the present disclosure.

Figure 5:
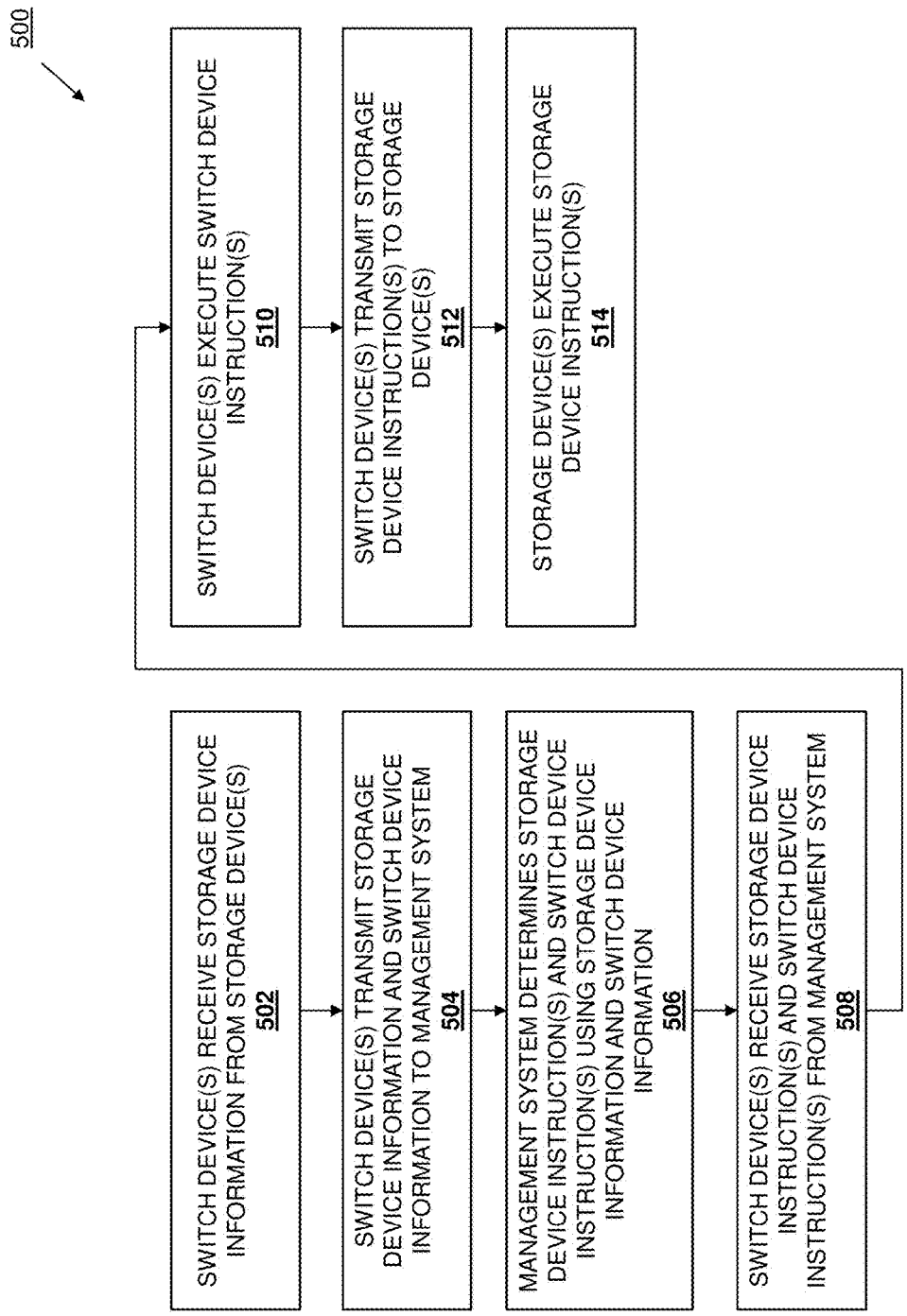
FIG. 5 is a flow chart illustrating an embodiment of a method for integrated monitoring and control of a storage/SAN system.

Referring now to FIG. 5, an embodiment of a method 500 for integrated monitoring and control of a storage/SAN system is illustrated. As discussed below, the integrated storage/SAN monitoring and control system 200 provides an API that presents an equipment-to-equipment management and control interface, along with a governing control protocol that may be performed either in-band or out-of-band between the SAN and the storage system, in order to provide for an integrated storage/SAN system that allows enhanced levels of monitoring and control of the storage/SAN system that are not possible without the SAN and storage system operating together as an integrated unit. Such monitoring and control functionality includes providing storage level functionality such as dynamic load balancing, disk cache balancing, failover operations, and rule enforcement and modification. In addition, the monitoring and control provides a tighter integration of environmental monitoring, zoning, and similar performance characteristics with feedback control mechanisms that are not available in conventional vendor tools and that allow for a much higher level of monitoring and control granularity and detail, enabling enhanced traffic management algorithms based on the higher detail of information provided by the switch devices and storage devices in the storage/SAN system. Such feedback control also allows for corrective action in response to end-to-end threshold alerts, automated zoning operations, and consolidated environmental monitoring/control of all components of the system from a single management interface such that the impact of any particular event in any device in the system can be analyzed and addressed by controlling that device or other devices in the system.

The method 500 begins at block 502 where switch device(s) receive storage device information from storage device(s). In an embodiment, at block 502, any of the switch devices 204a-d in the switch system 204 may receive storage device information from the storage device(s) in the storage device system 206 to which they are linked. For example, with reference to the links provided in the embodiment illustrated in FIG. 2, the device information retrieval and reporting engine 304 in the switch device 204a may receive storage device information through its communication system 306 from the storage devices 206a and/or 206c, the device information retrieval and reporting engine 304 in the switch device 204b may receive storage device information through its communication system 306 from the storage device 206b, the device information retrieval and reporting engine 304 in the switch device 204c may receive storage device information through its communication system 306 from the storage devices 206b and/or 206d, and/or the device information retrieval and reporting engine 304 in the switch device 204d may receive storage device information through its communication system 306 from the storage devices 206c and/or 206d. In some embodiments, the storage device information may be transmitted from the storage device(s) to the switch device(s) via in-band links such as, for example, the FC links discussed above. In this example, the system may only utilize in-band FC links along with an in-band FC management system, which provides benefits such as eliminating the need for a separate Ethernet management network (which increases security by eliminating unauthorized access via that Ethernet management network), but also requires the provision of an FC management server and network administrator. In other embodiments, the storage device information may be transmitted from the storage device(s) to the switch device(s) via out-of-band links such as, for example, the Ethernet links discussed above. For example, the system may also utilize out-of-band Ethernet links along with an out-of-band Ethernet management system, which provides benefits such as eliminating the need for a separate FC management server and network administrator, but suffers from the reduced security discussed above.

In different embodiments, the storage device information may be generated by any of the storage devices 206a-d in the storage system 206 in response to any of a variety of storage device events that would be apparent to one of skill in the art in possession of the present disclosure. For example, storage device information may include information about a disk cache in the storage device (e.g., disk cache usage), information about a storage device component (e.g., about the operation of or failure in a fan system in the storage device), information about storage space available in the storage device, information about storage bandwidth in the storage device, information about environmental factors effecting the storage device (e.g., temperature, humidity, etc.), information about changes in a Logical Unit Number (LUN) map (e.g., the adding of a World Wide Name (WWN) to the LUN) on a storage controller that controls the storage device, and/or a variety of other storage device information known in the art. In some embodiments, the device information retrieval and reporting engine 304 in the switch device 300 may receive the storage device information through the communication system 306 by retrieving that storage device information from its associated storage device using, for example, a GET command in an API call using the API 304a. In other embodiments, the device information retrieval and reporting engine 304 in the switch device 300 may receive the storage device information through the communication system 306 in response to its associated storage device using, for example, a POST or PUT command in an API call using the API 304a.

In a specific example, with reference to the embodiment of the API provided by the JSON-based equipment-to-equipment management and control interface and governing control protocol below, the switch device 300 may retrieve the internal storage device's BB credit link information, which can then be used by the switch to determine whether that storage device is having problems returning BB credit on a specific FC link, thus representing a slow drain SAN FC storage device downstream from the switch. The switch may then use this downstream slow drainer information to make an intelligent decision to move traffic off of ports connected to that storage component link and then notify the user so action can be taken to remedy the condition:

---

Example BB Credit Exchange via Get Statistics
Internal Storage Information API Call

---

Typical Information Flow Direction: Storage to switch
Storage Port Statistics API Call Method:
"path": "/StorageCenter/ScControllerPort/{portId}/Stats",
"operations":
[{
    "method": "GET",
    "summary": "Gets internal port statistics for a storage center controller port.",
    "type": "ScControllerPortStats",
    "nickname": "GetStorageControllerPortStats",
    "produces": ["application/json"],
    "parameters":
    [{
        "name": "portId",
        "required": true,
        "allowMultiple": "false",
        "description": "The port ID to get internal SC port statistics for.",
        "dataType": "string",
        "paramType": "path"
    }],
    "responseMessages":
    [{
        "code": "404",
        "message": "Requested port ID was not found."
    }]
}]
Object Data Exchanged Via API Call:
"ScControllerPortStats":
{
    "id": "ScControllerPortStats",
    "description": "Internal storage center port statistics",
    "properties":
    {
        "ResultType": {"type": "string"},
        "Errors": {"type": "integer"},
        "SyncLoss": {"type": "integer"},
        "InBytes": {"type": "integer"},
        "OutBytes": {"type": "integer"}
    }
},
"ScControllerFCPortStats":
{
    "id": "ScControllerFCPortStats",
    "extends": "ScControllerPortStats",
    "description": "Fibre channel specific port BB credit statistics",
    "required": ["BufferCredits"],
    "properties": { "BufferCredits": {"type": "integer"}
}

---

In another embodiment that illustrates the exchange of zoning information changes made in the storage array with the switch, the following API may be used when, for example, changes such as LUN map modifications are made in the storage system such that the associated zoning data changes can be automatically propagated to the switch via an API call:

Example Zone Configuration APIs Used to
Modify Switch Zones from Storage LUN Map

```
Typical Information Flow Direction: Storage to switch
Zone Set Manipulation API Call Methods:
"path": "/Switch/ZoneSet",
"operations":
[{
    "method": "GET",
    "summary": "Retrieves a zone set",
    "notes": "This retrieves a collection of all zone sets defined on the switch",
    "type": "ZoneSetList",
    "nickname": "GetZoneSetList",
    "produces": ["application/json"]
},
{
    "method": "PUT",
    "summary": "Creates a zone set",
    "notes": "Used to define a new zone set in the switch",
    "type": "ZoneSet",
    "nickname": "PutZoneSet",
    "produces": ["application/json"],
    "parameters":
    [{
        "name": "zoneSet",
        "description": "Zone set to be created.",
        "required": true,
        "type": "ZoneSet",
        "paramType": "body"
    }],
    "responseMessages":
    [
        {"code": 400, "message": "Invalid zone set definition."},
        {"code": 405, "message": "Validation exception."},
        {"code": 409, "message": "Zone set name already exists"}
    ]
},
{
    "method": "DELETE",
    "summary": "Removes a zone set.",
    "notes": "Used to delete a zone set.",
    "type": "void",
    "nickname": "DeleteZoneSet",
    "produces": ["application/json"],
    "parameters":
    [{
        "name": "zoneSetID",
        "description": "ID of the Zone set to be deleted.",
        "type": "integer"
    }],
    "responseMessages":
    [
        {"code": 403, "message": "Zone set currently in use"},
        {"code": 404, "message": "Zone set not found"}
    ]
}]
Individual Zone Manipulation API Call Methods:
"path": "/Switch/Zone",
"operations":
[{
    "method": "GET",
    "summary": "Gets specific zone information from the switch",
    "type": "FCZoneList",
    "nickname": "GetFCZoneList",
    "produces": ["application/json"]
},
{
    "method": "PUT",
    "summary": "Creates a zone in the switch",
    "type": "FCZone",
    "nickname": "CreateFCZone",
    "produces": ["application/json"],
    "parameters":
    [{
        "name": "fcZone",
        "description": "Zone to be created",
```

-continued

Example Zone Configuration APIs Used to
Modify Switch Zones from Storage LUN Map

```
        "type": "FCZone",
        "paramType": "body"
    }],
    "responseMessages":
    [
        {"code": 400, "message": "Invalid zone definition"},
        {"code": 405, "message": "Validation exception"},
        {"code": 409, "message": "Zone name already exists"}
    ]
},
{
    "method": "DELETE",
    "summary": "Removes a zone.",
    "type": "void",
    "nickname": "DeleteFCZone",
    "produces": ["application/json"],
    "parameters":
    [{
        "name": "zoneID",
        "description": "ID of the Zone to be deleted.",
        "type": "integer",
        "paramType": "path"
    }],
    "responseMessages":
    [
        {"code": 403, "message": "Zone currently in use"},
        {"code": 404, "message": "Zone not found"}
    ]
}
Object Data Exchanged:
"ZoneSet":
{
    "id": "ZoneSet",
    "description": "A zone set definition.",
    "properties":
    {
        "ID": {"type": "integer"}
        "Name": {"type": "string"}
        "Zones": {"type": "array"}
    }
},
"ZoneSetList":
{
    "id": "ZoneSetList",
    "description": "A collection of zone sets.",
    "properties": {"ZoneSets": {"type": "array", "items": {"$ref": "ZoneSet"}}}
},
"FCZone":
{
    "id": "FCZone",
    "description": "A fibre channel zoning definition.",
    "properties":
    {
        "ID": {"type": "integer"}
        "Name": {"type": "string"}
        "WWNs": {"type": "array"}
    }
}
"FCZoneList":
{
    "id": "FCZoneList",
    "description": "A collection of zones.",
    "properties": {"Zones": {"type": "array", "items": {"$ref": "FCZone"}}}
}
```

The method 500 then proceeds to block 504 where switch device(s) transmit storage device information and switch device information to the management system. In an embodiment, at block 504, any of the switch devices 204*a-d* in the switch system 204 may transmit storage device information received from the storage device(s) in the storage device system 206 at block 502, as well as switch device information generated by that switch device, to the management system 202. In different embodiments, the switch device information may be generated by any of the switch devices 204a-d in the switch system 204 in response to any of a variety of switch device events that would be apparent to one of skill in the art in possession of the present disclosure. For example, switch device information may include information about traffic handled by the switch device 300, information about a switch device component (e.g., about the operation of or failure in a fan system in the switch device 300), information about bandwidth available via the switch device 300, information about environmental factors effecting the switch device 300 (e.g., temperature, humidity, etc.), information about zoning in the switch device 300, and/or a variety of other switch device information known in the art.

For example, the device information retrieval and reporting engine 304 in the switch device 204a may transmit storage device information received from the storage devices 206a and/or 206c, along with switch device information generated by the operation of the switch device 204a, through its communication system 306 to the management system 202; the device information retrieval and reporting engine 304 in the switch device 204b may transmit storage device information received from the storage device 206b, along with switch device information generated by the operation of the switch device 204b, through its communication system 306 to the management system 202; the device information retrieval and reporting engine 304 in the switch device 204c may transmit storage device information received from the storage devices 206b and/or 206d, along with switch device information generated by the operation of the switch device 204c, through its communication system 306 to the management system 202; and/or the device information retrieval and reporting engine 304 in the switch device 204d may transmit storage device information received from the storage devices 206c and/or 206d, along with switch device information generated by the operation of the switch device 204d, through its communication system 306 to the management system 202.

In some embodiments, the device information retrieval and reporting engine 304 in the switch device 300 may transmit the storage device information and the switch device information through the communication system 306 to the management system 202 using, for example, a POST or PUT command in an API call using the API 304a. In other embodiments, the monitoring and control engine 404 in the management system 400 may retrieve the storage device information and the switch device information from the switch device 300 through the communication systems 408 and 306, respectively, using, for example, a GET command in an API call using the API 304a.

In a specific example, with reference to the API provided by the JSON-based equipment-to-equipment management and control interface and governing control protocol discussed below, the switch device 300 may transmit switch environmental information to the storage device as detailed by the API example provided below. Similarly, internal environmental monitoring data may be sent from the storage device to the switch, as outlined in the API example provided below. In one example of the use of these API's by the storage system, a switch fan or power supply status that is sent to the storage array may indicate a failure in the switch, and the storage system may then execute its failover to an alternate path that doesn't use that switch, to reduce downtime for data flow when the switch fails or is taken offline for maintenance:

Example Internal Environmental Monitoring APIs

Typical Information Flow Direction: Either switch to storage or storage to switch
Internal Switch Environment API Call Method:
"basePath": "http://switchhost/api",
"resourcePath": "/SwitchApi",
"produces": ["application/json"],
{
    "path": "/Switch",
    "operations":
    [{
        "method": "GET",
        "summary": "Gets information about the switch, including chassis data",
        "type": "SwitchInfo",
        "nickname": "GetSwitchInfo",
        "produces": ["application/json"]
    }]
}
Object Data Exchanged:
"PowerSupply":
{
    "id": "PowerSupply",
    "description": "A power supply unit",
    "properties":
    {
        "Vendor": {"type": "string"},
        "Status": {"type": "boolean"},
        "Position": {"type": "integer"}
    },
"SystemFan":
{
    "id": "SystemFan",
    "description": "A system fan unit",
    "properties":
    {
        "Vendor": {"type": "string"},
        "Status": {"type": "boolean"},
        "Position": {"type": "integer"}
    },
}
Internal Storage Environment API Call Method:
"path": "/StorageCenter/StorageCenterChassis",
"operations":
[{
    "method": "GET",
    "summary": "Gets information about the storage array chassis like fans and power supplies",
    "type": "StorageCenterChassisData",
    "nickname": "GetStorageCenterChassisData",
    "produces": ["application/json"],
}]
Object Data Exchanged:
"PowerSupply":
{
    "id": "PowerSupply",
    "description": "A power supply unit",
    "properties":
    {
        "Vendor": {"type": "string"},
        "Status": {"type": "boolean"},
        "Position": {"type": "integer"}
    },
"SystemFan":
{
    "id": "SystemFan",
    "description": "A system fan unit",
    "properties":
    {
        "Vendor": {"type": "string"},
        "Status": {"type": "boolean"},
        "Position": {"type": "integer"}
    },
}

The method 500 then proceeds to block 506 where the management system determines storage device instruction(s) and switch device instruction(s) using the storage device information and switch device information.

In an embodiment, at block 506, the monitoring and control engine 404 in the management system 202 may receive the storage device information and switch device information through the communication system 408 from any of the switch devices 204a-d in the switch system 204 at block 504, and use that storage device information and switch device information to determine storage device instruction(s) and switch device instruction(s). For example, the monitoring and control engine 404 in the management system 202 may use the storage device information and switch device information received from the switch device 204a to determine storage device instruction(s) and switch device instruction(s) for the storage devices 206a and/or 206c and the switch device 204a, use the storage device information and switch device information received from the switch device 204b to determine storage device instruction(s) and switch device instruction(s) for the storage device 206b and the switch device 204b, use the storage device information and switch device information received from the switch device 204c to determine storage device instruction(s) and switch device instruction(s) for the storage devices 206b and/or 206d and the switch device 204c, and/or use the storage device information and switch device information received from the switch device 204d to determine storage device instruction(s) and switch device instruction(s) for the storage devices 206c and/or 206d and the switch device 204d. In some embodiments, the management system 202 may generate a management graphical user interface (GUI) for display on a display device of the management system 202, which allows for an administrator user of the storage/SAN system to view the storage device information and/or switch device information, and provide inputs that may be used by the management system 202 to determine the storage device instruction(s) and/or switch device instruction(s In an embodiment, the determination of the storage device instruction(s) and switch device instruction(s) may include the monitoring and control engine 404 analyzing the storage device information and switch device information received at block 504 from any or all of the switch devices 204a-d to generate the storage device instruction(s) and switch device instruction(s). For example, the monitoring and control engine 404 in the management system 202/400 may analyze switch device information such as traffic information that is received from each of the switch devices 204a-b, and then generate switch device instructions that provide for dynamic load balancing across the switch system 204. Data used to make a load balancing determination may include the slow drain characteristics on a storage device that is downstream of the switch, which is exchanged via the API call similar to that discussed above with reference to the BB Credit Exchange. When it is determined that a given link is having trouble returning BB credit, the switch may make the determination to move the data flowing on this link to a more responsive or less heavily loaded link.

In another example, the monitoring and control engine 404 in the management system 202/400 or switch devices 204a-d may analyze information received from the storage system such as disk cache information generated by the each of the storage devices 206a-d and conveyed by each of the switch devices 204a-b, and then generate storage device instructions that provide for dynamic disk cache balancing across the storage devices 206a-d in the storage system 206. One example of the internal storage data and the internal storage API call used for exchanging this data used for end to end performance monitoring and control is shown below:

| Example Internal Storage Performance Monitoring and Control API |
|---|
| Storage Disk API Call Methods:<br>"path": "/Storage/Disk",<br>"operations":<br>[{<br>    "method": "GET",<br>    "summary": "Gets internal disk data statistics information from the storage array",<br>    "type": " ScControllerDiskData ",<br>    "nickname": "GetScControllerDiskStats",<br>    "produces": ["application/json"]<br>},<br>{<br>    "method": "PUT",<br>    "summary": "Sends instructions for adjusting internal disk statistics data to the storage array",<br>    "type": " ScControllerDiskData ",<br>    "nickname": "PutScControllerDiskData",<br>    "produces": ["application/json"]<br>},<br>Object Data Exchanged:<br>"ScControllerDiskData":<br>{<br>    "id": "ScControllerDiskData",<br>    "description": "Disk data for monitoring statistics and putting control to storage array",<br>    "properties":<br>    {<br>        "ResultType": {"type": "string"},<br>        "DiskErrorsReported": {"type": "integer"},<br>        "CacheReadErrors": {"type": "integer"},<br>        "CacheWriteErrors": {"type": "integer"}<br>        "CacheBalancingInstructions": {"type":"string"}<br>    }<br>} |

In some embodiments, the monitoring and control engine 404 in the management system 202/400 may access the control database 406 to retrieve one or more rules that may be used to generate storage device instruction(s) and/or switch device instruction(s). For example, the monitoring and control engine 404 in the management system 202/400 may access the control database 406 to retrieve rule(s) that limit the amount of data that may be stored on a storage device/storage device array, and/or that limit the bandwidth dedicated by one or more switch devices to that storage device/storage device array. The monitoring and control engine 404 in the management system 202/400 may use those rule(s) along with the analysis of storage device information that is indicative of data stored on the storage device(s) and that was generated by those storage device(s), and the analysis of switch device information that is indicative of that amount of bandwidth dedicated to those storage devices and that was generated by switch device(s) that provide traffic to those storage device(s), and generate storage device instruction(s) that move data between storage devices to meet the storage and/or bandwidth limits provided by the rule(s). Furthermore, in embodiments when such rules are repeatedly broken (e.g., excess storage in the storage device/storage device array, excess bandwidth dedicated by the switch device(s) to a storage device/storage device array, etc.), the monitoring and control engine 404 in the management system 202/400 may generate storage device instruction(s) that raise the data storage limits on the storage device/storage device array and/or switch device instruction(s) that raise the bandwidth limits dedicated by the switch device(s) to the storage device/storage device array, as well as generate a notification to an administrator of those actions (e.g., for display via the management GUI discussed above). An example of the API calls that may be used for exchanging this type of data is included in the Internal Environmental Monitoring APIs discussed above.

In yet another example, the monitoring and control engine 404 in the management system 202/400 may analyze storage device information such as a change in a LUN map generated by at least of the storage devices 206a-d (e.g., in response to adding a WWN to the LUN), and then generate switch device instructions that provide for zoning changes in the switch device(s) (as well as in Fibre Channel adapters and/or other switch device components). These changes then reflect the changes in the LUN map on the storage device(s) to the switch automatically, thus providing automatic zoning across the SAN from a central location, and eliminating the need for manual configuration and the associated possibility of configuration errors in multiple places throughout the SAN. The API calls used for this are similar to those discussed above with reference to the Zone Configuration APIs.

In yet another example, the monitoring and control engine 404 in the management system 202/400 may analyze storage device information and/or switch device information that reflect environmental changes in the storage device(s) and/or switch device(s), and then generate storage device instruction(s) and/or switch device instruction(s) that compensate or address those environmental changes, thus allowing for the impact of an environmental event in a device in the system to be assessed, identified to each device, and recovery actions to be taken. One example of the API calls used for this is discussed above with reference to the Internal Environmental Monitoring APIs, and details an example of switch internal environmental data being transferred to the storage device so that the storage device can take into account switch environmental change and take actions based on that.

The method 500 then proceeds to block 508 where switch device(s) receive storage device instruction(s) and switch device instruction(s) from the management system. In an embodiment, at block 508, any of the switch devices 204a-d in the switch system 204 may receive storage device instruction(s) and switch device instruction(s) determined by the management system 202 at block 506. For example, the monitoring and control engine 404 in the management system 400 may send the storage device instruction(s) and the switch device instruction(s) through the communication system 408 to any switch device 204a-d associated with the switch device instruction(s), as well as any switch device 204a-d that is configured to forward the storage device instruction(s) to the storage device 260a-d associated with the storage device instruction(s). At block 508, the device information retrieval and reporting engine 304 in the switch device 300 may receive storage device instruction(s) and switch device instruction(s) through the communication system 306 from the management system 202.

For example, the device information retrieval and reporting engine 304 in the switch device 204a may receive switch device instruction(s) for the switch device 204a and storage device instruction(s) for the storage devices 206a and/or 206c through the communication system 306 from the management system 202, the device information retrieval and reporting engine 304 in the switch device 204b may receive may receive switch device instruction(s) for the switch device 204b and storage device instructions for the storage device 206b through the communication system 306 from the management system 202, the device information retrieval and reporting engine 304 in the switch device 204c may receive switch device instruction(s) for the switch device 204c and storage device instruction(s) for the storage devices 206b and/or 206d through the communication system 306 from the management system 202, and/or the device information retrieval and reporting engine 304 in the switch device 204d may receive may receive switch device instruction(s) for the switch device 204d and storage device instruction(s) for the storage devices 206c and/or 206d through the communication system 306 from the management system 202.

In some embodiments, the device information retrieval and reporting engine 304 in the switch device 300 may receive the storage device instruction(s) and/or the switch device instruction(s) through the communication system 306 by retrieving those storage device instruction(s) and/or the switch device instruction(s) from the management system 202 using, for example, a GET command in an API call using the API 304a. In other embodiments, the monitoring and control engine 404 in the management system 400 may transmit the storage device instruction(s) and/or the switch device instruction(s) through the communication system 408 to switch devices 204a-d using, for example, a POST or PUT command in an API call using the API 304a.

The method 500 then proceeds to block 510 where switch device(s) execute switch device instruction(s). In an embodiment, at block 510, any of the switch devices 204a-d in the switch system 204 may execute switch device instruction(s) received from the management system 202 at block 508. For example, the device information retrieval and reporting engine 304 in the switch device 204a may execute switch device instruction(s) for the switch device 204a that were received from the management system 202, the device information retrieval and reporting engine 304 in the switch device 204b may execute switch device instruction(s) for the switch device 204b that were received from the management system 202, the device information retrieval and reporting engine 304 in the switch device 204c may execute switch device instruction(s) for the switch device 204c that were received from the management system 202, the device information retrieval and reporting engine 304 in the switch device 204d may execute switch device instruction(s) for the switch device 204d that were received from the management system 202. As discussed above switch device instruction(s) executed by the switch device(s) 204a-d may cause traffic to be rerouted through the switch system 204, zoning changes to be realized, environmental issues to be recovered from, and/or may provide a variety of other benefits that would be apparent to one of skill in the art in possession of the present disclosure.

Figure 6:
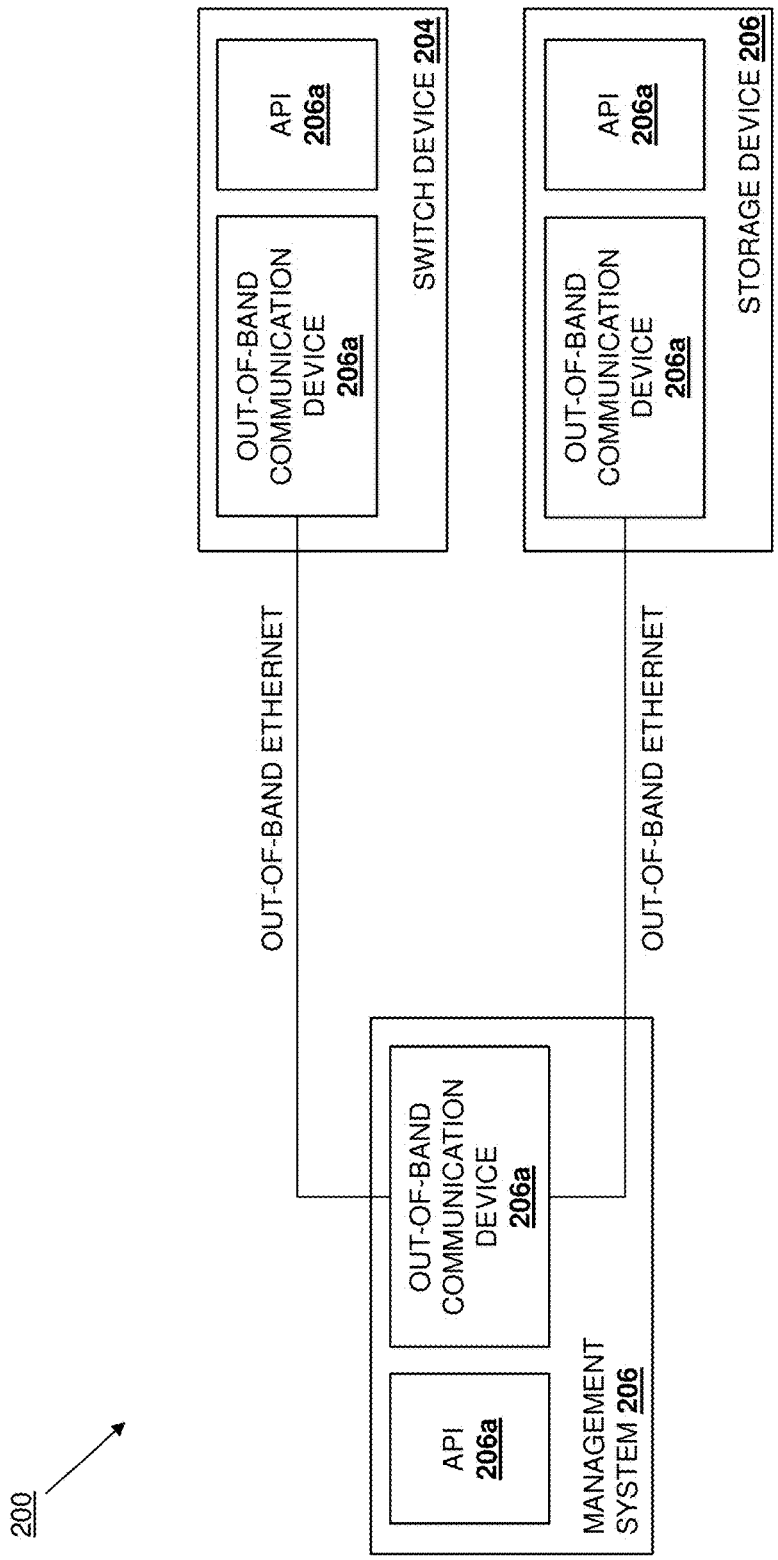
FIG. 6 is a schematic view illustrating an embodiment of the integrated storage/SAN monitoring and control system of FIG. 2 utilizing out-of-band communication connections.
Figure 7:
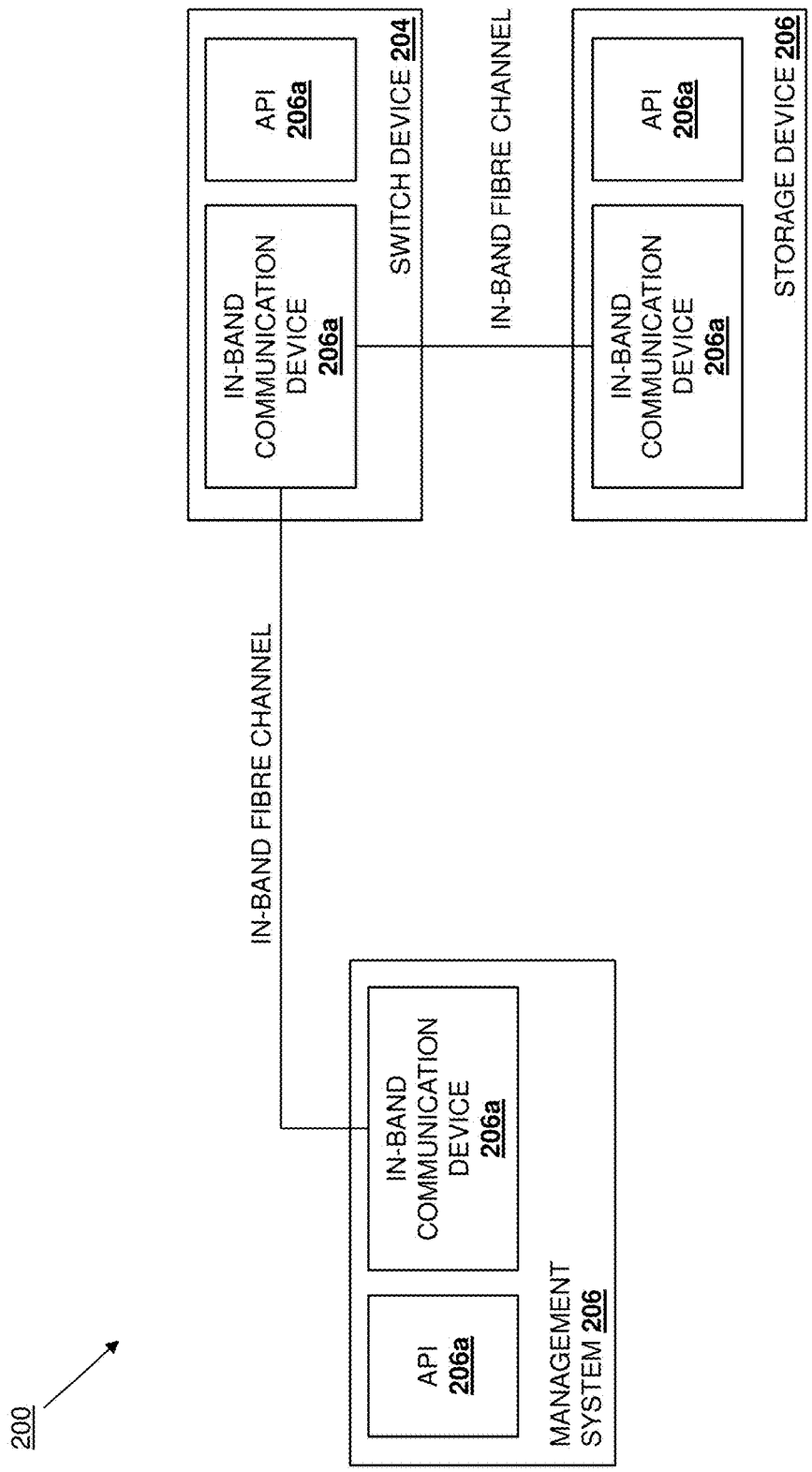
FIG. 7 is a schematic view illustrating an embodiment of the integrated storage/SAN monitoring and control system of FIG. 2 utilizing in-band communication connections.
Figure 8:
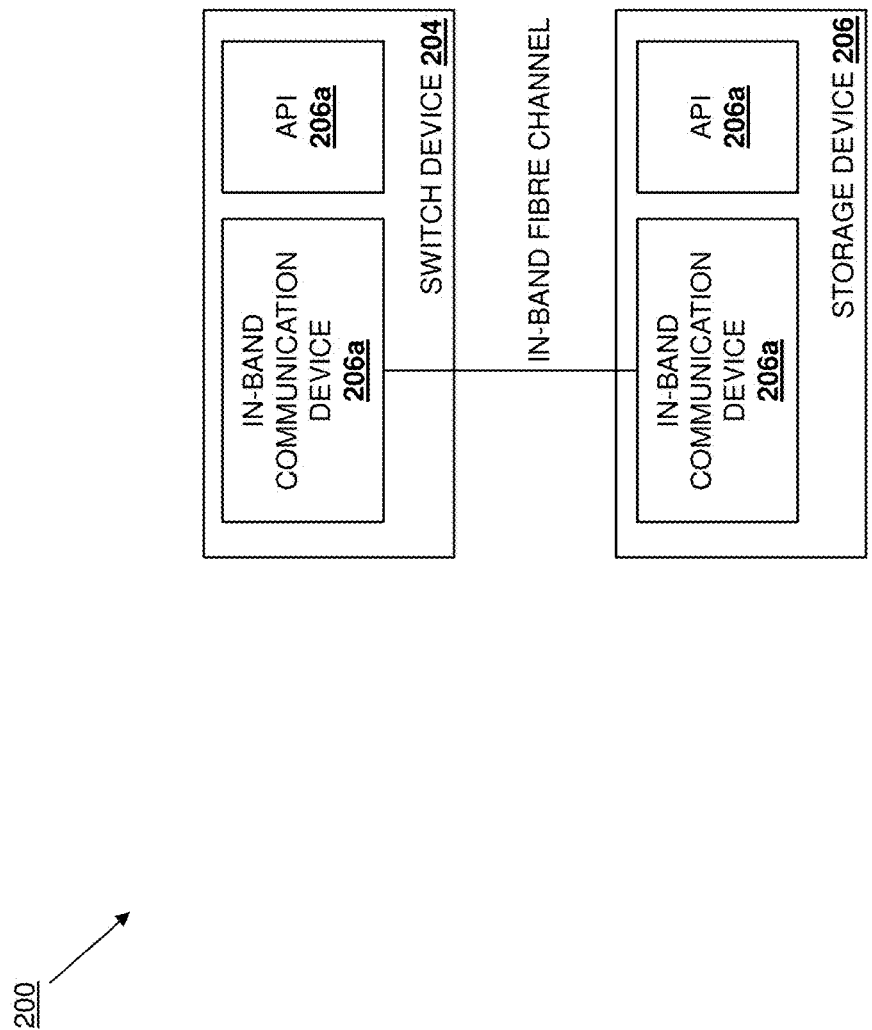
FIG. 8 is a schematic view illustrating an embodiment of the integrated storage/SAN monitoring and control system of FIG. 2 utilizing in-band communication connections
Figure 10:
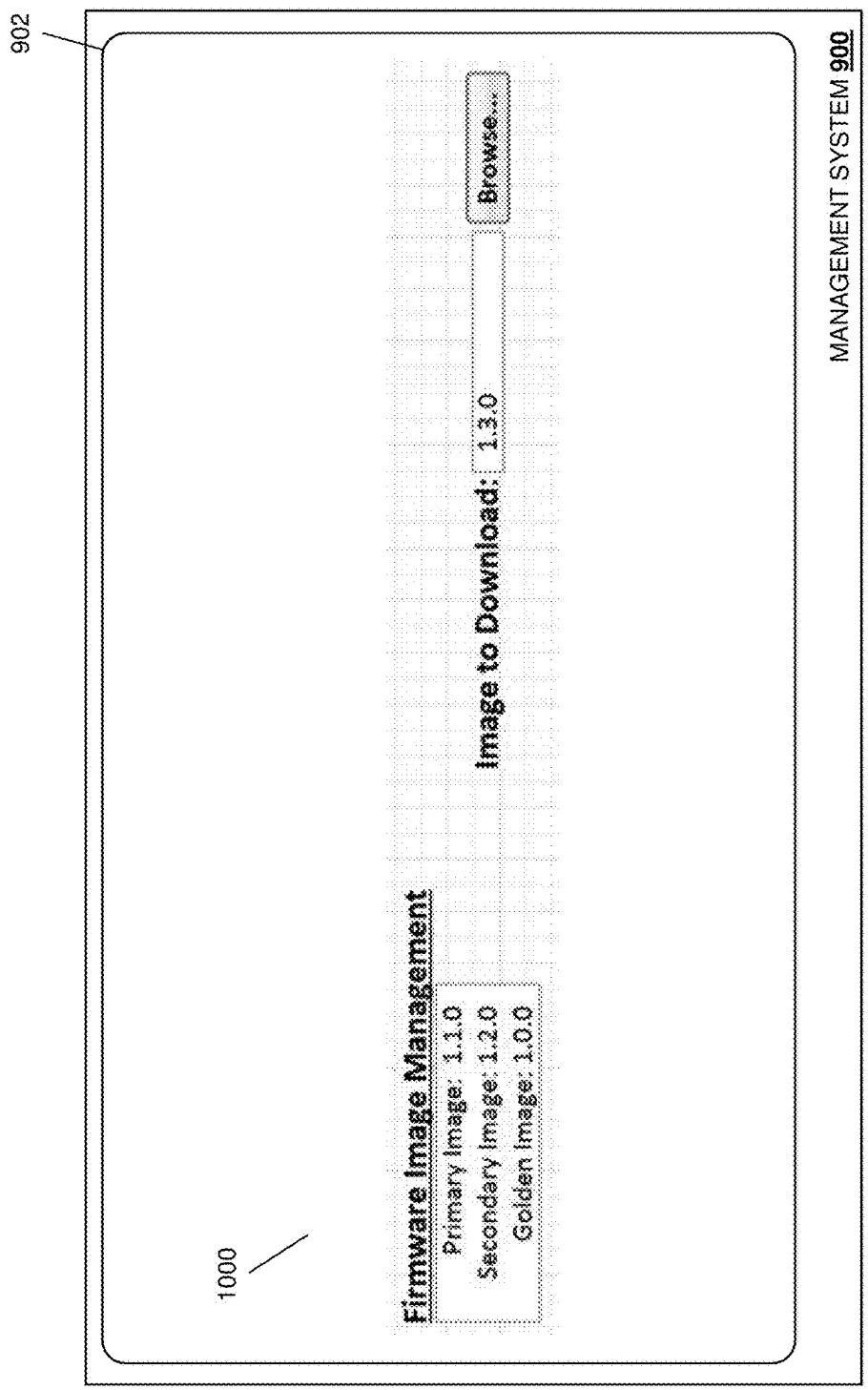
FIG. 10 is a screen shot view illustrating an embodiment of the management system of FIG. 4 displaying an integrated storage/SAN firmware management screen.

The method 500 then proceeds to block 512 where switch device(s) transmit storage device instruction(s) to the storage device(s). In an embodiment, at block 512, any of the switch devices 204a-d in the switch system 204 may transmit the storage device instruction(s) received from the management system 202 at block 508 to the storage device(s) for which those storage device instructions were generated. For example, the device information and retrieval engine 304 in the switch device 204a may transmit storage device instruction(s) for the storage devices 206a and/or 206b, the device information and retrieval engine 304 in the switch device 204b may transmit storage device instruction(s) for the storage device 206c, the device information and retrieval engine 304 in the switch device 204c may transmit storage device instruction(s) for the storage devices 206b and/or 206d, and/or the device information and retrieval engine 304 in the switch device 204d may transmit storage device instruction(s) for the storage devices 206c and/or 206d. In some embodiments, the storage device instruction(s) may be transmitted from the storage device(s)

to the switch device(s) via in-band links such as, for example, the FC links discussed above. In other embodiments, the storage device instruction(s) may be transmitted from the storage device(s) to the switch device(s) via out-of-band links such as, for example, the Ethernet links discussed above. Various in-band and out-of-band communication links that may be utilized in the SAN environment are illustrated in FIGS. 6, 7, and 8, and the API described herein is intended to work with all of these storage/switch communication mechanisms found across the SAN environment.

In some embodiments, the device information retrieval and reporting engine 304 in the switch device 300 may transmit the storage device instruction(s) through the communication system 306 to the associated storage device(s) using, for example, a POST or PUT command in an API call using the API calls via the API 304a. In other embodiments, the storage device(s) 206a-d may retrieve the storage device instruction(s) from their associated switch devices 204a-d using, for example, a GET command in an API call directly using the API 304a. In a specific example, with reference to the API provided by the JSON-based equipment-to-equipment management and control interface and governing control protocol included at the end of this description, the switch device 300 may transmit the storage device instruction(s) to associated storage device(s) as detailed in that API example as well as the API examples discussed above.

The method 500 then proceeds to block 514 where storage device(s) execute storage device instruction(s). In an embodiment, at block 514, any of the storage devices 206a-d in the storage system 206 may execute storage device instruction(s) received from the switch device(s) 204a-d in the switch system 204 at block 512. For example, the storage device 206a may execute storage device instruction(s) received from the switch device 204a, the storage device 206b may execute storage device instruction(s) received from the switch device(s) 204b and/or 204c, the storage device 206c may execute storage device instruction(s) received from the switch device(s) 204a and/or 204d, and/or the storage device 206d may execute storage device instruction(s) received from the switch device(s) 204c and/or 204d. As discussed above storage device instruction(s) executed by the storage device(s) 206a-d may cause data to be moved in the storage system, environmental issues to be recovered from, and/or may provide a variety of other benefits that would be apparent to one of skill in the art in possession of the present disclosure.

Thus, an integrated storage/SAN monitoring and control system and method have been described that provides an API for switch devices in the SAN that allows for the transmittal of switch device information and storage device information from switch devices in the SAN and storage devices in the storage system to a management system for monitoring. Specifically, API calls using the API allow for the transfer of storage device information generated during the operation of each of the storage devices in the storage system to the switch devices, and the transfer of that storage device information, along with switch device information generated during the operation of each of the switch devices, to the management system. The management system may then analyze that storage device information and switch device information together to get a view of the storage system and the SAN as an integrated entity, and generate storage device instructions and/or switch device instructions based on that view and/or rules that define how the integrated storage/SAN system should operate. API calls using the API then further allow the transfer of those storage device instructions and/or switch device instructions from the management system to the switch devices, as well as the transfer of the storage device instructions from the switch devices to the storage devices. Execution of the switch device instructions by the switch devices, and the storage device instructions by the storage devices, allows actions determined necessary or desirable by the management system to be implemented on the integrated storage/SAN system, thus providing the integrated storage/SAN monitoring and control system of the present disclosure. One of skill in the art in possession of the present disclosure will recognize how such integrated control allows for end-to-end performance monitoring and troubleshooting associated with BB credit starvation or slow drainer devices, as well as determinations of how environmental conditions in one or more devices are effecting end-to-end traffic behavior.

Figure 9:
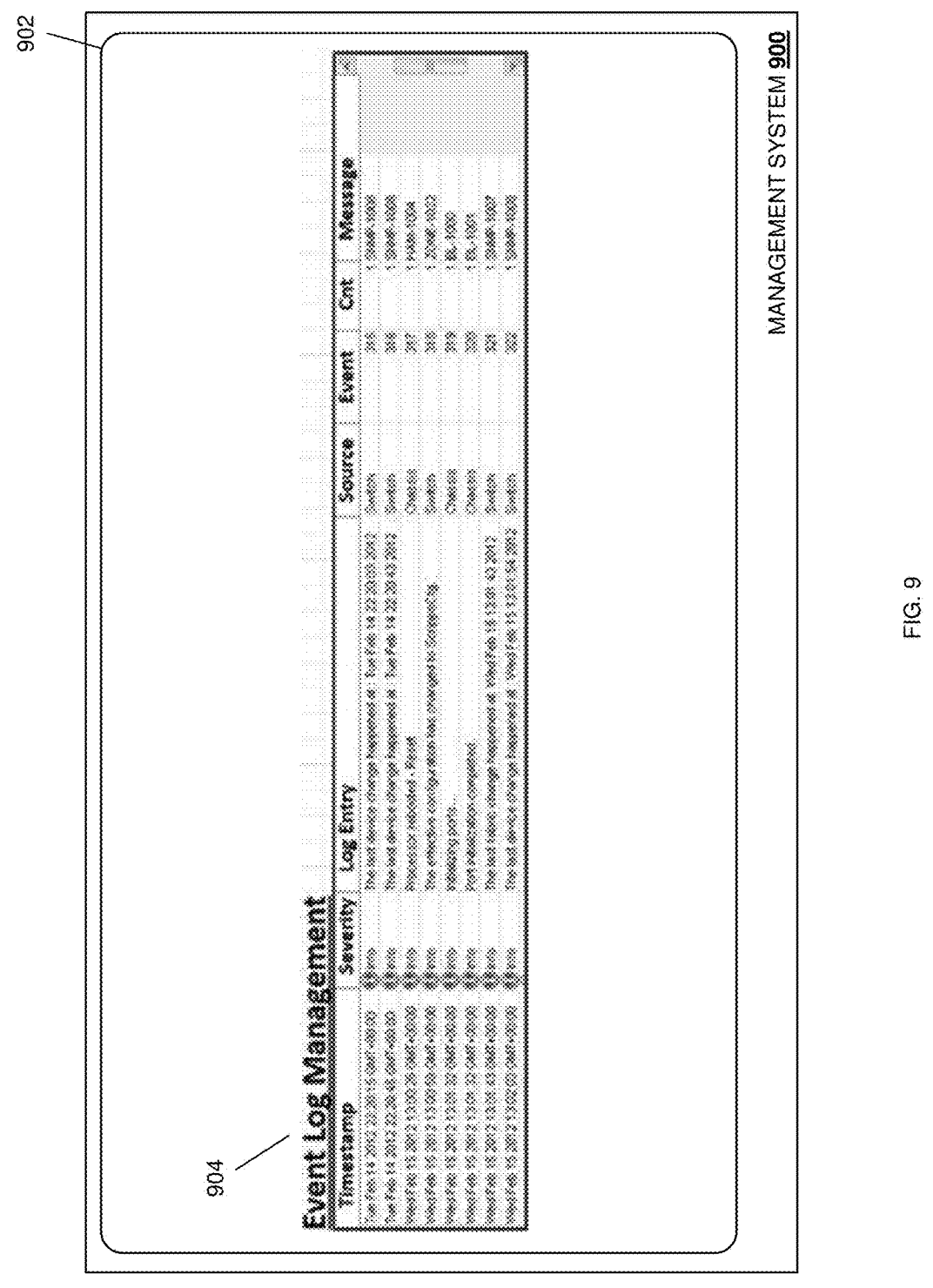

Referring now to FIG. 9, an embodiment of a management system 900 is illustrated that includes a display device 902 displaying an integrated storage/SAN event log screen 904. For example, the management system 900 may be the management systems 202 and/or 400 discussed above. The integrated storage/SAN event log screen 604 may be realized using the teachings of the present disclosure, and is enabled by the tight integration of the switch system 204 and the storage system 206 via the API that allows for event logs of the switch system 204 and the storage system 206 to be integrated as a single unit even though they are generated on physical separate devices. The integrated storage/SAN event log screen 604 illustrates a consolidated event log for both the switch system 204 and the storage system 206 that may be acted on by the management system 202, as well as any of the switch devices 204a-d in the switch system 204 and any of the storage devices 206a-d in the storage system 206.

Referring now to FIG. 8, an embodiment of the management system 900 is illustrated that includes the display device 902 displaying an integrated storage/SAN firmware management screen 1000. As discussed above, the management system 900 may be the management systems 202 and/or 400. The integrated storage/SAN firmware management screen 1000 may be realized using the teachings of the present disclosure, and is enabled by the tight integration of the switch system 204 and the storage system 206 via the API that allows for management of common firmware for the switch system 204 and the storage system 206 to be performed. For example, a firmware image may be downloaded to a switch device in the switch system 204 from a storage device in the storage system 206. Furthermore, other software code may be pushed from a switch device in the switch system 204 to a storage device in the storage system 206 via the API.

Figure 11:
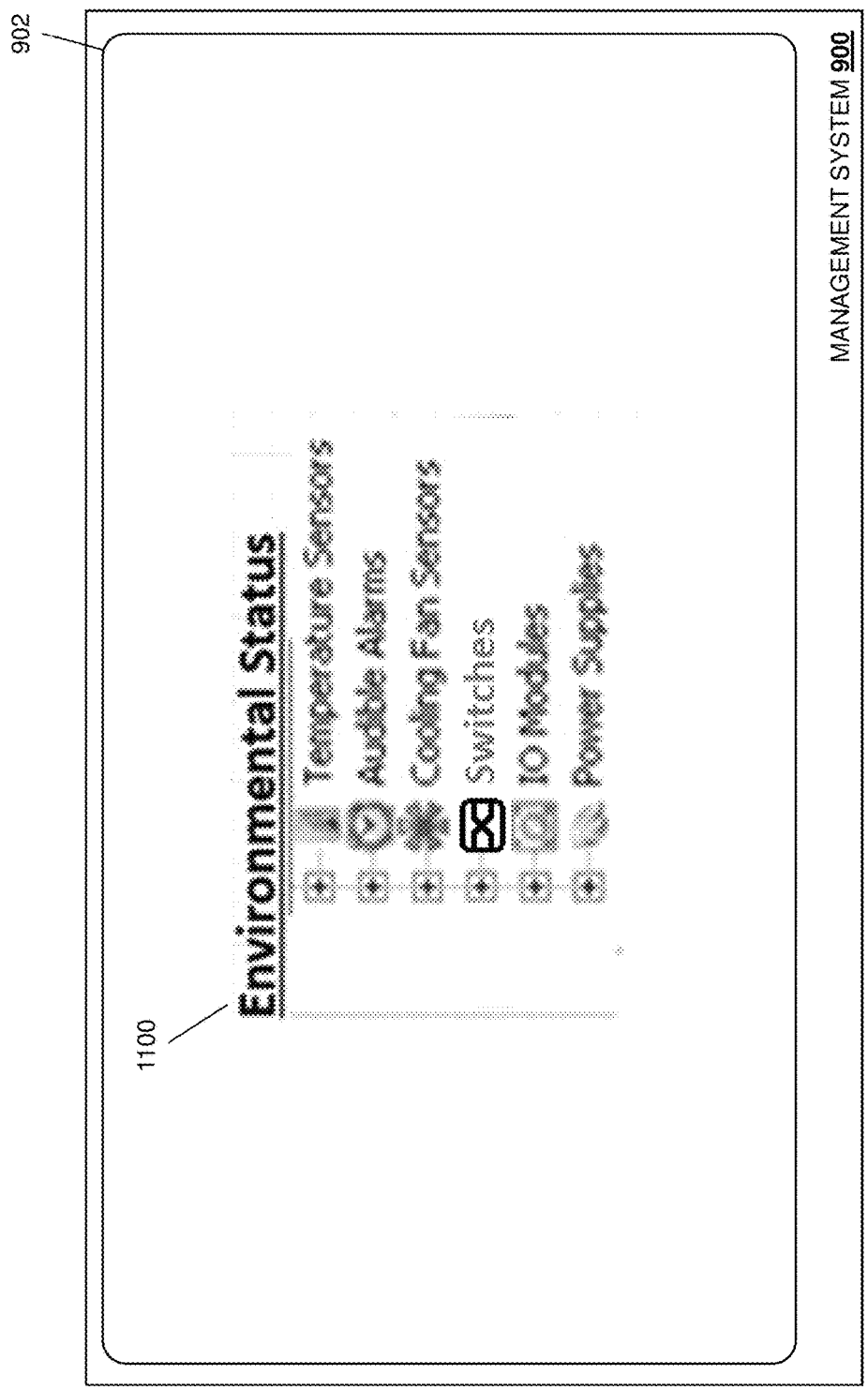
FIG. 11 is a screen shot view illustrating an embodiment of the management system of FIG. 4 displaying an integrated storage/SAN environmental status screen.

Referring now to FIG. 11, an embodiment of the management system 900 is illustrated that includes the display device 902 displaying an integrated storage/SAN environmental status screen 1100. As discussed above, the management system 900 may be the management systems 202 and/or 400. The integrated storage/SAN environmental status screen 1100 may be realized using the teachings of the present disclosure, and is enabled by the tight integration of the switch system 204 and the storage system 206 via the API that allows for switch device environmental status to be linked with storage system management and control, as well as be viewed and managed in the same manner as the storage device environmental status even though they are separate devices.

Below is an example of an API that is provided by a JSON-based equipment-to-equipment management and control interface and governing control protocol and that may be utilized in the switch devices as discussed above:
Internal Switch Information API Description
See Computer Program Listing Appendix on Compact Disk mailed to US Patent and Trademark Office per 7 CFR 1.96

Below is a full example of the portion of the API that provides access to the internal storage information via the JSON-based equipment-to-equipment management and control interface and governing control protocol and that may be utilized in the switch devices as discussed above:
Internal Storage Information API Description
See Computer Program Listing Appendix on Compact Disk Mailed to US Patent and Trademark Office Per 7 CFR 1.96

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An integrated storage/storage area network (SAN) monitoring and control system, comprising:
   a storage device;
   a switch device that is coupled to the storage device and that is associated with a switch device Application Programming Interface (API), wherein the switch device is configured to:
      receive storage device information from the storage device via an API call using the switch device API; and
      transmit the storage device information and switch device information via an API call using the switch device API;
   a management system that is coupled to the switch device and that is configured to:
      receive the storage device information and the switch device information transmitted by the switch device via the API call using the switch device API;
      determine at least one storage device control instruction and at least one switch device control instruction using the storage device information and the switch device information;
      transmit the at least one storage device control instruction and at least one switch device control instruction to the switch device via an API call using the switch device API, wherein the switch device is configured to execute the at least one switch device instruction and transmit the at least one storage device instruction to the storage device for execution via an API call using the switch device API.

2. The system of claim 1, wherein the management system is configured to:
   generate a storage/SAN monitoring graphical user interface (GUI) using the storage device information and the switch device information; and
   provide the storage/SAN monitoring GUI for display on a display device.

3. The system of claim 1, wherein the switch device is coupled to the storage device by an in-band Fibre-Channel (FC) link.

4. The system of claim 1, wherein the switch device is coupled to the storage device by an out-of-band Ethernet link.

5. The system of claim 1, wherein the management system includes a control database and the management system is configured to:
   retrieve at least one rule from the control database; and
   use the at least one rule with the storage device information and the switch device information to determine at least one storage device control instruction and at least one switch device control instruction.

6. The system of claim 1, wherein the storage device information includes a World Wide Name (WWN) that was added to a Logical Unit Number (LUN), and wherein the at least one switch device control instruction causes the switch device to modify zoning information included in the switch device.

7. The system of claim 1, wherein the storage device information includes an environmental event in the storage device, and wherein the at least one switch device control instruction causes the switch device to compensate for the environmental event in the storage device.

8. An information handling system (IHS), comprising:
   a communication system;
   a processing system that is coupled to the communication system; and
   a memory system that is coupled to the processing system and that includes instructions that, when executed by the processing system, cause the processing system to provide a device information retrieval and reporting engine that is associated with an Application Programming Interface (API) and that is configured to:
      receive storage device information through the communication system from a storage device via an API call using the API;
      transmit the storage device information and switch device information through the communication system to a management system via an API call using the API;
      receive at least one storage device control instruction and at least one switch device control instruction through the communication system from the management system via an API call using the API;
      execute the at least one switch device instruction; and
      transmit the at least one storage device instruction through the communication system to the storage device for execution via an API call using the API.

9. The IHS of claim 8, wherein the communication system is coupled to the storage device by an in-band Fibre-Channel (FC) link.

10. The IHS of claim 8, wherein the communication system is coupled to the storage device by an out-of-band Ethernet link.

11. The IHS of claim 8, wherein the storage device information includes a World Wide Name (WWN) that was added to a Logical Unit Number (LUN), and wherein the at least one switch device control instruction causes the switch device to modify zoning information included in the switch device.

12. The IHS of claim 8, wherein the storage device information includes an environmental event in the storage device, and wherein the at least one switch device control instruction causes the switch device to compensate for the environmental event in the storage device.

13. The IHS of claim 8, further comprising:
   an agent that is configured to execute the at least one switch device instruction and transmit the at least one storage device instruction to the storage device.

14. A method for integrated monitoring and control of a storage/storage area network (SAN) system, comprising:

receiving, by a switch device, storage device information from a storage device via an API call using the API;

transmitting, by the switch device, the storage device information and switch device information to a management system via an API call using the API;

receiving, by the switch device, at least one storage device control instruction and at least one switch device control instruction from the management system via an API call using the API;

executing, by the switch device, the at least one switch device instruction; and transmitting, by the switch device, the at least one storage device instruction to the storage device for execution via an API call using the API.

15. The method of claim 14, further comprising:

generating, by the management system, a storage/SAN monitoring graphical user interface (GUI) using the storage device information and the switch device information; and providing, by the management system, the storage/SAN monitoring GUI for display on a display device.

16. The method of claim 14, wherein the switch device is coupled to the storage device by an in-band Fibre-Channel (FC) link.

17. The method of claim 14, wherein the switch device is coupled to the storage device by an out-of-band Ethernet link.

18. The method of claim 14, further comprising:

retrieving, by the management system, at least one rule from a control database; and using, by the management system, the at least one rule with the storage device information and the switch device information to determine at least one storage device control instruction and at least one switch device control instruction.

19. The method of claim 14, wherein the storage device information includes a World Wide Name (WWN) that was added to a Logical Unit Number (LUN), and wherein the at least one switch device control instruction causes the switch device to modify zoning information included in the switch device.

20. The method of claim 14, wherein the storage device information includes an environmental event in the storage device, and wherein the at least one switch device control instruction causes the switch device to compensate for the environmental event in the storage device.

* * * * *